United States Patent
Cunningham et al.

(10) Patent No.: US 10,493,427 B2
(45) Date of Patent: Dec. 3, 2019

(54) MULTI-STAGE ACTIVATED CARBON SYSTEMS AND PROCESSES WITH RECYCLED STREAMS

(71) Applicant: Siemens Energy, Inc., Orlando, FL (US)

(72) Inventors: William Cunningham, Sun Prairie, WI (US); Claude E. Ellis, Walnut, CA (US); Simon Larson, Wausau, WI (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 15/759,929

(22) PCT Filed: Sep. 19, 2016

(86) PCT No.: PCT/US2016/052432
§ 371 (c)(1),
(2) Date: Mar. 14, 2018

(87) PCT Pub. No.: WO2017/058543
PCT Pub. Date: Apr. 6, 2017

(65) Prior Publication Data
US 2019/0046952 A1     Feb. 14, 2019

Related U.S. Application Data

(60) Provisional application No. 62/235,139, filed on Sep. 30, 2015.

(51) Int. Cl.
*B01J 20/20* (2006.01)
*B01J 20/34* (2006.01)
(Continued)

(52) U.S. Cl.
CPC .......... *B01J 20/20* (2013.01); *B01J 20/3416* (2013.01); *B01J 20/3466* (2013.01); *C02F 1/283* (2013.01); *C02F 3/106* (2013.01); *C02F 3/302* (2013.01); *C02F 11/08* (2013.01); *C02F 2003/003* (2013.01); *C02F 2301/08* (2013.01); *C02F 2303/16* (2013.01); *Y02W 10/15* (2015.05)

(58) Field of Classification Search
CPC .... B01J 20/20; B01J 20/3466; B01J 20/3416; C02F 3/106; C02F 1/283
See application file for complete search history.

(56) References Cited

U.S. PATENT DOCUMENTS

| | | | |
|---|---|---|---|
| 4,203,835 A | 5/1980 | Katsumi | |
| 5,658,458 A * | 8/1997 | Keyser | B01D 21/26 210/195.1 |

(Continued)

OTHER PUBLICATIONS

Khin, T., "Novel microbial nitrogen removal processes," Biotechnology Advances 22 (2004) pp. 519-532 (Year: 2004).*

(Continued)

*Primary Examiner* — Chester T Barry

(57) ABSTRACT

There are provided herein methods and systems for increasing efficiency in a multi-stage activated carbon system. The methods and systems provide a cleaned carbon solids fraction and a waste liquor from wet air regeneration, and direct the same to a second stage and a first stage, respectively, of the multi-stage activated carbon system to enhance removal efficiency therein.

14 Claims, 1 Drawing Sheet

(51) Int. Cl.
*C02F 1/28* (2006.01)
*C02F 3/10* (2006.01)
*C02F 3/30* (2006.01)
*C02F 11/08* (2006.01)
*C02F 3/00* (2006.01)

(56) References Cited

U.S. PATENT DOCUMENTS

| | | | |
|---|---|---|---|
| 5,824,222 A * | 10/1998 | Keyser | B01D 21/26 |
| | | | 210/607 |
| 6,660,163 B2 * | 12/2003 | Miklos | C02F 3/006 |
| | | | 210/605 |
| 9,090,487 B2 | 7/2015 | Ellis | |
| 2014/0061134 A1 | 3/2014 | Felch et al. | |

OTHER PUBLICATIONS

Deeny, K., et al., "Performance of Activated Sludge—Powdered Activated Carbon—Wet Air Regeneration Systems," US EPA Project Summary, Risk Reduction Engineering Laboratory, Cincinnati, OH, EPA/600/52-90/012 Aug. 1990 (Year: 1990).*

PCT International Search Report and Written Opinion of International Searching Authority dated Dec. 16, 2016 corresponding to PCT International Application No. PCT/US2016/052432 filed Sep. 19, 2016.

* cited by examiner

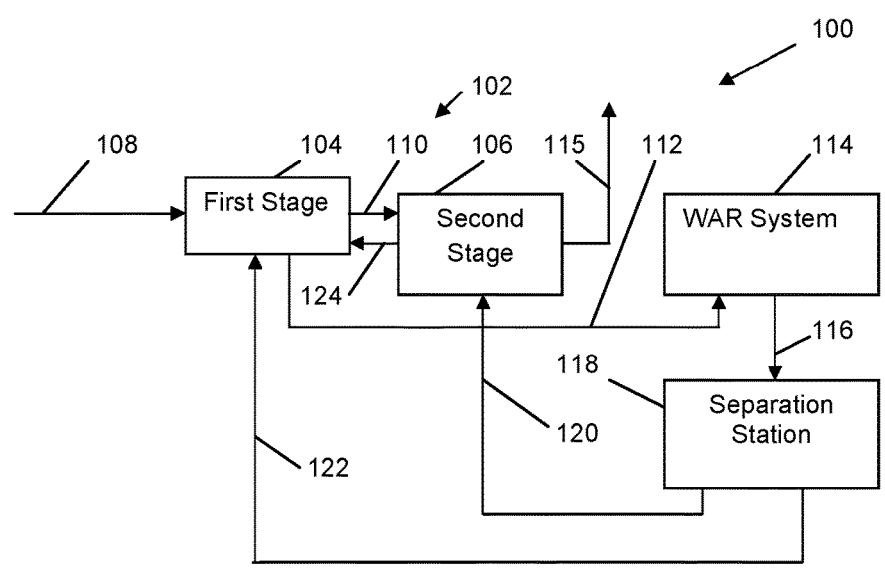

MULTI-STAGE ACTIVATED CARBON SYSTEMS AND PROCESSES WITH RECYCLED STREAMS

CROSS REFERENCES TO RELATED APPLICATIONS

This application is a National Stage Application of PCT/US2016/052432, filed Sep. 19, 2016, which claimed priority to and the benefit of the filing date of U.S. Provisional Application No. 62/235,139, filed Sep. 30, 2015. The entirety of each application is hereby incorporated by reference.

FIELD

The present invention relates to wastewater treatment, and more particularly to processes and systems for efficiently treating wastewater in a multi-stage activated carbon system.

BACKGROUND

Powdered activated carbon treatment (PACT) systems combine biological treatment and carbon adsorption into a single synergistic step. The result is superior pollutant removal efficiencies. The PACT system is typically coupled with a wet air regeneration (WAR) system, which utilizes high temperature and pressure conditions for regenerating spent carbon from the PACT system while simultaneously oxidizing biological solids (when present) accompanying the spent carbon. In an effort to increase the efficiency of pollutant removal to meet increasingly stringent requirements in certain jurisdictions, multi-stage PACT systems have been developed. The principles of two-stage PACT operation have included biodegradable organics removal and some refractory organics removal by carbon absorption in the first stage, and final polishing to low level effluent removal by further carbon absorption in the second stage. Due to the increased footprint, material costs, and operational costs of a multi-stage system relative to a single stage system, more efficient processes and systems are needed.

BRIEF DESCRIPTION OF THE DRAWINGS

The invention is explained in the following description in view of the drawings that show:

FIG. 1 is a schematic diagram of an apparatus in accordance with an aspect of the present invention.

SUMMARY

The present inventors have developed treatment processes and systems which may substantially reduce the necessary footprint, material costs, and operational costs incurred in the treatment of wastewater with a multi-stage activated carbon system, such as a multi-stage PACT system. In accordance with an aspect, there are provided processes and systems which treat a wastewater with a powdered activated carbon material in a multi-stage PACT system, generate a spent carbon material, regenerate the spent carbon in a WAR system, and separate an effluent from the WAR system into a cleaned carbon solids fraction and a waste liquor. The cleaned carbon solids fraction may be delivered to at least a second stage of the PACT system while the waste liquor may be delivered to a first stage of a PACT system. In an embodiment, the cleaned carbon solids fraction may thereafter be directed from the second stage to the first stage in a counterflow direction to the wastewaster being treated within the PACT system. As will be explained further below, aspects of the present invention may thus provide a substantially contaminant-free recycled carbon source from the WAR regeneration process while also increasing removal efficiency in the multi-stage PACT system.

In accordance with one aspect, there is provided a method for treating wastewater comprising:

treating an amount of wastewater in a powdered activated carbon treatment (PACT) system comprising a first stage and at least a second stage, each stage comprising an amount of powdered activated carbon therein, wherein the treating removes at least one contaminant from the wastewater and produces a spent carbon material;

directing an amount of the spent carbon material to a wet air regeneration system (WAR) for regeneration of the spent carbon material;

separating an effluent from the WAR system into a cleaned carbon solids fraction and a waste liquor;

directing the cleaned carbon solids fraction to the second stage; and directing the waste liquor to the first stage for use in treating additional wastewater in the first stage, thereby relieving the second stage from gross pollutant removal and allowing the second stage to serve as a polishing step to remove first stage effluent contaminants.

In accordance with another aspect, there is provided an apparatus for treating wastewater comprising:

a powdered activated carbon treatment (PACT) system comprising a first stage and at least a second stage, each stage comprising an amount of powdered activated carbon therein, the PACT system configured to treat an amount of wastewater in the stages to remove at least one contaminant from the wastewater and produce a spent carbon material;

a wet air regeneration (WAR) system in fluid communication with the PACT system and configured to regenerate the spent carbon material; and a separation station in communication with the WAR system configured to separate an effluent from the wet air regeneration system into a cleaned carbon solids fraction and a waste liquor;

wherein the separation station is in fluid communication with an input of the second stage and is configured to direct the cleaned carbon solids fraction to the second stage to treat additional wastewater in the second stage; and wherein the separation station is further in fluid communication with an input of the first stage and is configured to direct the waste liquor to the first stage to treat additional wastewater therein.

In accordance with an aspect, the separation of the waste liquor from the regenerated carbon material allows the contaminants from the effluent from the WAR process to be utilized in the first stage while the cleaned regenerated carbon, optionally along with fresh virgin make-up carbon, acts as effective polishing agents in the second stage.

DETAILED DESCRIPTION

Referring now to the FIGURES, FIG. 1 illustrates an exemplary embodiment of a system 100 for treating wastewater 108 in accordance with an aspect of the present invention. In the embodiment shown, the apparatus 100 comprises a powdered activated carbon treatment (PACT) system 102 as is known in the art comprising at least a first stage 104 and a second stage 106. Although two stages are shown, it is understood that the system 102 may include more than two stages in certain embodiments and the principles described herein may be applied to any of the stages.

In any case, each stage of the PACT system 102 comprises an amount of powdered activated carbon therein. In an embodiment, each stage 104, 106 comprises a distinct vessel having an amount of powdered activated carbon material therein. In other embodiments, a single vessel may be utilized and the stages 104, 106 may be composed therein, but separated from one another to avoid mixing of contents thereof. The powdered activated carbon in each stage may be provided in an amount effective to adsorb or otherwise remove a desired amount of one or more contaminants, such as organic contaminants, from the wastewater 108. In certain aspects, the powdered activated carbon may be effective to remove an amount of recalcitrant organics in the fluid delivered to the PACT system 102.

In another aspect, at least the first stage 104 further includes a biomass population suitable to promote the treatment of the wastewater 108. In another embodiment, each of the first stage 104 and the second stage 106 includes powdered activated carbon, as well as a biomass population. The biomass population may include any suitable population of bacterial micro-organisms effective to digest biodegradable material, including one that does so with reduced solids production. Exemplary wastewater treatment with reduced solids production are described in U.S. Pat. Nos. 6,660,163; 5,824,222; and 5,658,458, each of which are incorporated by reference herein in their entireties. The bacteria may comprise any bacteria or combination of bacteria suitable to thrive in anoxic and/or aerobic conditions.

The PACT system 102 is in fluid communication with a suitable source of the wastewater 108 so as to deliver the wastewater 108 to the PACT system 102. As used herein, by "fluid communication," it is meant that a fluid may flow from one component to another component. The wastewater 108 may be any suitable fluid having at least one contaminant therein for removal by the PACT system 102. The wastewater 108 may be derived from any suitable source and may undergo one or more other pre-treatment or treatment processes prior to introduction to the PACT system 102. Without limitation, exemplary contaminants to be removed by the PACT system 102 may include pesticides herbicides, phenols, phthalates, and hydrocarbons, e.g., aromatic hydrocarbons, aliphatic hydrocarbons, and the like. In an aspect, the system 100 may be configured to treat the wastewater 108 with a powdered activated carbon material in the first stage 104 of the PACT system 102 under conditions and for a duration effective to produce a first treated material 110 comprising a reduced amount of the at least one contaminant therein. The first treated material 110 may then be directed to the second stage 106 for further treatment of the first treated material 110 with further activated carbon material, thereby producing a polished stream 115, which may be delivered to storage, transport, or the like. In this way, the first stage 104 may serve as a bulk treatment for removal of contaminants from the wastewater 108 while the second stage 106 polishes the resulting stream from the first stage 104 (stream 115).

It is appreciated that the activated carbon material in the first and/or second stages 104, 106 may be utilized to concentrate the one or more contaminants of the wastewater thereon until the carbon material becomes "spent." In an embodiment, the activated carbon material has become spent when the ability of the carbon material to remove further target component from the wastewater has become nearly or completely exhausted and/or when the wastewater 108 from the first or second stage comprises more than a predetermination amount of the contaminant(s). The latter determination may be made by suitable quantitative or semi-quantitative methods, such as a chromatography technique as is known in the art. In any case, the first stage 104 and/or the second stage 106 may produce a spent carbon material 112, which may be directed to a wet air regeneration (WAR) system 114 of the system 100 for regeneration of the spent carbon material 112. When a biomass population is employed in stages 104 and/or 106, the spent carbon material 112 may further include an amount of biological waste therein.

In an embodiment, the spent carbon material 112 may be in the form of a slurry or sludge having a water content ranging from about 90% to about 97% (solids content of about 3-10%). As used herein, the term "about" refers to a value which may be ±5% of the stated value. In certain embodiments, the spent carbon material 112 may be conditioned in a gravity thickener (e.g., a sedimentation tank) to provide the spent carbon material 112 in the form of a thickened sludge material before input to the WAR system 114. In addition, the spent carbon material 112 may be heated prior to delivery to the WAR system 114 to help initiate the oxidation/regeneration process. Further, the spent carbon material 112 may be mixed with an oxidant, such as a pressurized oxygen-containing gas, which may be supplied by a compressor and then flowed through a heat exchanger prior to entry in the WAR system 114. The oxidant may be added to the spent carbon material 112 prior to and/or after flow of the spent carbon material 112 through the heat exchanger.

In an exemplary embodiment, the WAR system 114 may comprise one or more dedicated reactor vessels (WAR units) in which regeneration of the spent carbon material 112 and oxidation of relevant components, such as any biological solids and organics, may take place. In particular, within each WAR unit of the WAR system 114, the components therein may also be heated for a suitable time and under suitable conditions effective for the oxidation and/or regeneration of the spent carbon material 112 to take place so as to produce an effluent 116 which includes at least regenerated carbon material and a waste material, e.g., alcohols, hydrocarbons, and/or nitrogen compounds, and the like. In an embodiment, the WAR process is carried out at a temperature of about 150° C. to about 320° C. (about 275° F. to about 705° F.) at a pressure of about 10 bara to about 220 bara (about 150 psia to about 3200 psia). Upon completion of the WAR process, the effluent 116 may then exit each WAR unit in the WAR system 114. A gaseous portion (offgas) may also be produced having an oxygen content.

In accordance with an aspect, however, the effluent 116 from each WAR unit is delivered from the WAR system 114 to a separation station 118 to provide at least a cleaned carbon solids fraction 120 comprising regenerated carbon material and a waste liquor 122 comprising byproducts from the WAR process. By "cleaned," it is meant that a liquid portion comprising byproducts from the effluent 116 is removed from the effluent 116 such that a remaining carbon solids portion includes a reduced amount of the byproducts from the WAR process. As such, the separation station 118 comprises suitable components necessary for carrying out a separation technique or other process which may provide the cleaned carbon solids fraction 120 and the waste liquor 122 comprising byproducts from regeneration. In an embodiment, the separation station 118 is configured to carry out one or more separation and/or filtration processes.

By way of example, the separation station 118 may comprise a centrifuge, a recessed plate filter press, a vacuum filtration apparatus, a solid/liquid hydrocyclone, one or more gravity thickeners (e.g., arranged in series), one or more elutriators, and/or components suitable to carry out repeated decanting/reconstituting techniques to generate the relevant liquid and solid fractions. In a particular embodiment, the cleaned carbon solids fraction 120 and the waste liquor 122 may be produced by decanting and removing a liquid portion from the effluent 116, rediluting the remaining material back to original volume with contaminant-free water, decanting again, and removing an additional liquid portion.

In accordance with another aspect, the effluent 116 may comprise an amount of ammonium or other nitrogen-containing contaminants therein. In some instances, it may be desirable to treat and/or remove these nitrogen-containing contaminants from the effluent 116 prior to disposal, transport, or storage of the waste liquor 122 of the effluent 116. Accordingly, in an embodiment, the separation station 118 may further comprise components suitable to carry out a process to treat the nitrogen-containing contaminants in the effluent 116, such as a Single Reactor System for High Activity Ammonium Removal Over Nitrite (SHARON) process as in known in the art. The SHARON process is characterized in that it forms nitrites from the nitrogen-containing contaminants rather than complete oxidation to nitrates. In particular, nitrate formation by nitrifying bacteria (such as *Nitrobacter*) is prevented by adjusting temperature, pH, and retention time to select for nitrifying bacteria (such as *Nitrosomonas*). In an embodiment, the SHARON process is carried out on the waste liquor 122 after separation of the effluent 116 into the waste liquor 122 and the cleaned carbon solids fraction 120, or only on the effluent 116 and the cleaned effluent directed to the second stage 106. Exemplary equipment and process parameters for carrying out a SHARON process are set forth in U.S. Pat. Nos. 5,863,435 and 6,485,646, the entirety of each of which is hereby incorporated by reference.

In accordance with another aspect, the separation station 118 may further include components suitable for washing the cleaned carbon solids fraction 120. In this case, the separation station 118 may comprise a filter press, a vacuum filter, a centrifuge, or the like along with components for adding a washing step. By way of example, when vacuum filtration is used, clean water jets may direct water or a wash fluid at a rotating drum to flush fresh fluid through a dewatered filter cake (comprising the carbon solids) for washing the same.

In accordance with yet another aspect, a filter press may be used to remove the majority of the liquid portion from the effluent 116. Thereafter, the filtered material may be reconstituted with contaminant free water and pumped back to the second stage 106 as the cleaned carbon solids fraction 120. Accordingly, in certain embodiments, after a separation step has taken place, the cleaned carbon solids fraction 120 may be further mixed or washed with a suitable wash fluid, such as an aqueous fluid comprising little to no contaminants therein (<1% by wt). In addition, in an aspect, the cleaned carbon solids fraction 120 may be brought to a desired solids content prior to delivery to the second stage 106. For example, in an embodiment, the solids content of the cleaned carbon solids fraction 120 may be from about 3% to 45% by weight, and in certain embodiments from 6% to 20% by weight.

Once generated, the cleaned carbon solids fraction 120 may be directed from the separation station 118 to the second stage 106 of the PACT system 102. Because it is substantially free of contaminants, the cleaned carbon solids fraction 120 reduces the need for make up carbon in the second stage 106, recycles and reuses the regenerated carbon material from the WAR system 114, and provides a consistent source of carbon material which can also be delivered from the second stage 106 to the first stage 104 (if desired) in certain embodiments.

In accordance with another aspect, the waste liquor 122, which comprises reaction byproducts from the WAR process, may be directed from the separation station 118 to the first stage 104 of the PACT system 102. This aspect may enhance contaminant removal in the first stage 104 because activated carbon material may have a higher affinity where contamination concentration is higher. Accordingly, by intentionally adding easy to degrade, additional contaminants (e.g., waste liquor 122) to the first stage in addition to the contaminant-containing wastewater 108, removal efficiency of contaminants (such as nitrate) from the wastewater 108 may be increased in the first stage 104 with a reduction of additional contaminants. Thereafter, the resulting first treated stream 110 from the first stage 104 may be directed to the second stage 106 for polishing thereof with the cleaned carbon solids product 120 to produce stream 115.

In accordance with another aspect, the effluent 116 from the wet oxidation regeneration process in the WAR system 114 may further comprise inorganic ash particles removed from the wastewater 108 (by the activated carbon) and formed during the regeneration process. Without intervention, the continued recycling of this ash along with the regenerated carbon through the system 100 may eventually lead to an undesirable accumulation of ash therein. Thus, in accordance with an aspect, the separation station 118 comprises components that separate the effluent 116 into a regenerated carbon portion (cleaned carbon solids fraction 120) and a waste liquor portion (waste liquor 122), and that also remove ash from the effluent 116 and/or the cleaned carbon solids fraction 120. One exemplary process which can be used to remove ash from regenerated carbon (e.g., fraction 120) is referred to as a Differential Sedimentation and Elutriation (DSE) process. An exemplary DSE process and components for carrying out the same are described in U.S. Pat. No. 4,749,492, the entirety of which is incorporated by reference herein.

In an exemplary DSE process set forth in U.S. Pat. No. 4,749,492, regenerated adsorbent particles are recovered from a wet oxidation-regenerated mixed liquor sludge by diluting and settling a blowdown slurry from the wet oxidation reactor to obtain a first aqueous phase containing primarily regenerated adsorbent particles and fine ash particles, and a first solids phase containing primarily grit particles. The first aqueous phase is combined with a portion of the regenerated adsorbent particle slurry after treatment with a dispersing agent and then an anionic flocculating agent, the resulting mixture is settled to obtain a second aqueous phase containing primarily fine ash particles and a second solids phase containing primarily regenerated adsorbent particles. The fine ash is disposed, not returned to the system 100, thereby reducing the size of the system 100 since inert ash is not accumulated.

In accordance with another aspect, as the wastewater travels from the first stage 104 to the second stage 106 to be treated with powdered activated carbon materially and biological solids (when present), the cleaned carbon solids fraction 120 may be directed in a counterflow direction from the second stage 106 to the first stage 104 (shown by arrow 124) to provide necessary activated carbon material for the treatment of the wastewater in the first stage 104 as is necessary. In this way, the first stage 104 may also be replenished with relatively clean regenerated carbon material as any spent carbon is withdrawn from the first 104 and/or second stages 106.

In the embodiments described herein, it is appreciated that one or more inlets, pathways, outlets, pumps, valves, coolers, energy sources, flow sensors, or controllers (comprising a microprocessor and a memory), or the like may be included in any of the systems and processes described herein for facilitating the introduction, introduction, output, timing, volume, selection, and direction of flows of any of the components (e.g., regenerated carbon, spent carbon, steams, etc.) therein. Exemplary activated carbon systems are also described in U.S. Pat. Nos. 9,090,487 and 8,501,011 and US Published Patent Application No. 2014/0061134, and the entirety of each is incorporated by reference herein.

Any references to examples, embodiments, components, elements or acts of the systems and methods herein referred to in the singular may also embrace embodiments including a plurality, and any references in plural to any embodiment, component, element or act herein may also embrace embodiments including only a singularity.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for treating wastewater comprising:
   treating an amount of wastewater in a powdered activated carbon treatment (PACT) system comprising a first stage and at least a second stage, each stage comprising an amount of powdered activated carbon therein, wherein the treating removes at least one contaminant from the wastewater and produces a spent carbon material;
   directing an amount of the spent carbon material to a wet air regeneration system (WAR) for regeneration of the spent carbon material;
   separating an effluent from the WAR system into a cleaned carbon solids fraction and a waste liquor;
   directing the cleaned carbon solids fraction to the second stage; and
   directing the waste liquor to the first stage for use in treating additional wastewater in the first stage, thereby relieving the second stage from gross pollutant removal and allowing the second stage to serve as a polishing step to remove first stage effluent contaminants.

2. The method of claim 1, wherein the separating of the effluent further comprises washing the cleaned carbon solids fraction with an amount of an aqueous wash solution.

3. The method of claim 2, wherein the separating of the effluent from the WAR system is done by vacuum filtration of the effluent to provide the cleaned carbon solids fraction and the waste liquor.

4. The method of claim 2, wherein the separating is done by repeated decanting and redilution of the effluent to provide the cleaned carbon solids fraction and the waste liquor.

5. The method of claim 1, further comprising adding water to the cleaned carbon solids fraction to bring the cleaned carbon solids fraction to a slurry.

6. The method of claim 1, wherein the cleaned carbon solids fraction comprises a solids content of from about 3 percent to about 45 percent by weight.

7. The method of claim 1, wherein the first stage and the second stage each comprise an amount of powdered activated material and biological material.

8. The method of claim 1, further comprising directing carbon material comprising the cleaned carbon solids fraction from the second stage to the first stage.

9. The method of claim 1, further comprising subjecting the waste liquor or the effluent to a process for treatment of nitrogen-containing contaminants in the waste liquor or the effluent.

10. The method of claim 1, further comprising subjecting the effluent or cleaned carbon solids fraction to a process separating an amount of ash from regenerated carbon in the effluent or cleaned carbon solids fraction.

11. A system for treating wastewater comprising:
    a powdered activated carbon treatment (PACT) system comprising a first stage and at least a second stage, each stage comprising an amount of powdered activated carbon therein, the PACT system configured to treat an amount of wastewater in the stages to remove at least one contaminant from the wastewater and produce a spent carbon material;
    a wet air regeneration (WAR) system in fluid communication with the PACT system and configured to regenerate the spent carbon material; and
    a separation station in fluid communication with the WAR system configured to separate an effluent from the WAR system into a cleaned carbon solids fraction and a waste liquor;
    wherein the separation station is in fluid communication with an inlet of the second stage and is configured to direct the cleaned carbon solids fraction to the second stage to treat additional wastewater in the second stage; and
    wherein the separation station is further in fluid communication with an inlet of the first stage and is configured to direct the waste liquor to the first stage to treat additional wastewater therein.

12. The apparatus of claim 11, wherein the separation station comprises at least one of a solid/liquid hydrocyclone, a centrifuge, a recessed plate filter press, a gravity thickener, an elutriator, or a vacuum filtration apparatus.

13. The apparatus of claim 11, wherein the cleaned carbon solids fraction comprises a solids content of from about 3 percent to about 45 percent by weight.

14. The apparatus of claim 11, wherein each the first stage and the second stage comprises an amount of powdered activated material and biological material.

* * * * *